US 7,783,756 B2

(12) United States Patent
Choyi et al.

(10) Patent No.: US 7,783,756 B2
(45) Date of Patent: Aug. 24, 2010

(54) PROTECTION FOR WIRELESS DEVICES AGAINST FALSE ACCESS-POINT ATTACKS

(75) Inventors: Vinod Kumar Choyi, Ottawa (CA); Bertrand Marquet, Ottawa (CA); Frederic Gariador, Toulouse (FR)

(73) Assignee: Alcatel Lucent, Paris (FR)

( * ) Notice: Subject to any disclaimer, the term of this patent is extended or adjusted under 35 U.S.C. 154(b) by 1465 days.

(21) Appl. No.: 11/143,620

(22) Filed: Jun. 3, 2005

(65) Prior Publication Data
US 2006/0274643 A1 Dec. 7, 2006

(51) Int. Cl.
*G06F 15/173* (2006.01)
(52) U.S. Cl. .................. 709/225; 709/226; 709/227; 709/229; 726/3
(58) Field of Classification Search .......... 709/226, 709/225, 227, 229; 713/162, 201; 726/3; 370/310, 216
See application file for complete search history.

(56) References Cited

U.S. PATENT DOCUMENTS

| 7,069,024 | B2* | 6/2006 | Sharony | 455/456.1 |
|---|---|---|---|---|
| 7,319,681 | B2* | 1/2008 | Park | 370/331 |
| 7,336,670 | B1* | 2/2008 | Calhoun et al. | 370/401 |
| 7,342,906 | B1* | 3/2008 | Calhoun | 370/338 |
| 7,453,840 | B1* | 11/2008 | Dietrich et al. | 370/328 |
| 2001/0016907 | A1* | 8/2001 | Kang et al. | 713/152 |
| 2001/0048744 | A1* | 12/2001 | Kimura | 380/247 |
| 2003/0117985 | A1* | 6/2003 | Fujii et al. | 370/338 |
| 2003/0177267 | A1* | 9/2003 | Orava et al. | 709/245 |
| 2004/0003285 | A1* | 1/2004 | Whelan et al. | 713/201 |
| 2004/0006642 | A1* | 1/2004 | Jang et al. | 709/245 |
| 2004/0023640 | A1* | 2/2004 | Ballai | 455/411 |
| 2004/0068653 | A1* | 4/2004 | Fascenda | 713/168 |
| 2004/0138900 | A1* | 7/2004 | Read | 705/1 |
| 2004/0162084 | A1* | 8/2004 | Wang | 455/456.1 |
| 2004/0213260 | A1* | 10/2004 | Leung et al. | 370/395.3 |
| 2004/0250077 | A1* | 12/2004 | Jang et al. | 713/175 |
| 2005/0021979 | A1* | 1/2005 | Wiedmann et al. | 713/182 |
| 2005/0050318 | A1* | 3/2005 | Alone et al. | 713/155 |
| 2005/0058112 | A1* | 3/2005 | Lahey et al. | 370/338 |
| 2005/0073979 | A1* | 4/2005 | Barber et al. | 370/338 |

(Continued)

FOREIGN PATENT DOCUMENTS

WO WO 2005/011231 2/2005

OTHER PUBLICATIONS

Guo et al.; Sequence Number-Based MAC Address Spoof Detection; 2006; Springer-Verlag Berlin Heidelberg; pp. 309-329.*

(Continued)

*Primary Examiner*—Kevin Bates
*Assistant Examiner*—Jimmy H Tran
(74) *Attorney, Agent, or Firm*—Kramer & Amado, P.C.

(57) ABSTRACT

Mechanisms and methods for providing a mobile/wireless device with protection against false access-point/base-station attacks using MAC address protection are presented. The mobile/wireless device known as mobile client (MC) gains access to wireless network by discovering and selectively associating with an access point (AP). The MAC addresses of both the AP and the MC are protected during all communications between the AP and MC during the discovery phase. This protection mitigates MAC address spoofing type attacks on both the AP and the MC.

25 Claims, 1 Drawing Sheet

U.S. PATENT DOCUMENTS

| | | |
|---|---|---|
| 2005/0141498 A1* | 6/2005 | Cam Winget et al. ....... 370/389 |
| 2005/0171720 A1* | 8/2005 | Olson et al. .................. 702/121 |
| 2005/0185615 A1* | 8/2005 | Zegelin ....................... 370/331 |
| 2005/0259611 A1* | 11/2005 | Bhagwat et al. ............. 370/328 |
| 2006/0104243 A1* | 5/2006 | Park ........................... 370/331 |
| 2006/0114863 A1* | 6/2006 | Sanzgiri et al. ............. 370/338 |
| 2006/0120317 A1* | 6/2006 | Zheng ........................ 370/315 |
| 2007/0106894 A1* | 5/2007 | Zhang et al. ................. 713/170 |
| 2007/0118748 A1* | 5/2007 | Edney ........................ 713/171 |
| 2008/0066157 A1* | 3/2008 | Stevens et al. ................. 726/4 |

OTHER PUBLICATIONS

Johnson et al.; Overview of IEEE 802.16 Security; 2004; The IEEE Computer Society; pp. 40-48.*

* cited by examiner

PROTECTION FOR WIRELESS DEVICES AGAINST FALSE ACCESS-POINT ATTACKS

FIELD OF THE INVENTION

The present invention relates to wireless/mobile networks and more particularly to mechanisms for providing protection against false Access Point or false Base Station attacks against wireless/mobile devices in such networks.

BACKGROUND

In present day communications networks there is a significant requirement that security issues, including unwanted intrusions from rogue attackers, be fully addressed. To this end considerable effort is being, and has been, devoted to finding ways of preventing unwanted attacks by malicious and ingenious hackers. Typically, as new solutions are introduced, attackers find ways of counteracting them.

Enterprise, Wireless Local Area Network (WLAN) security, in particular, is a very serious concern, considering that false-base station attacks can be carried out from unsuspecting locations such as parking-lots and from the curb-side. It is generally accepted that large-scale adoption of WLAN will happen only if robust and simple security mechanisms against such attacks are implemented. Mobile and wireless manufactures have been trying with varying degrees of success to promote Enterprise WLAN adoption but current figures suggest that only 25% of Corporate users trust the security offered by WLAN in enterprise environments. The present invention provides security solutions which are not limited to Corporate environments, but can be used in the home and home offices as well.

One prior art solution provides for Mutual Authentication between Access Points and Mobile/Wireless devices using the IEEE 802.11i standards. In this prior art solution the Authentication Phase is performed after the Discovery Phase and the Association Phase are implemented. The connection is established first and then Authentication is performed. The Mobile device is authenticated by means of an Authentication Server (generally a Radius Server) located in the home network using the Identity of the Mobile. The Authentication Server is also mutually authenticated by the mobile and, since the Access Point that performs access control in the WLAN network that may be controlled by the same Operator is trusted by the home operator, it is therefore trusted by the Authentication Server using prior Security established with the Access Point.

Generally, the prior art focuses effort on connectivity to any AP for WLAN service but the present solution focuses only on APs that are of interest to the Mobile/Wireless devices.

The prior art solutions require quite a bit of messaging before trust is established between the mobile and the Access Points (hereafter referred to as AP). In short, the authenticity of an AP is not established until the Authentication Phase, which happens after the Probe Exchange, the Beacon messages are sent and the Association Phase. During these message exchanges an Access Point can send malicious management messages which can be used to consume radio and battery resources resulting in a Denial-of-Service scenario. Genuine APs sending beacon frames but which are of no interest to a particular mobile client are processed even though they are not from an AP of interest which again consumes valuable computing/battery resources.

SUMMARY OF THE INVENTION

The present invention proposes a mechanism for the prevention of false Access-Point or False-Base-Station attacks, making sure that this protection is guaranteed to the mobile/wireless devices right from the discovery phase. The procedure is referred to herein as Selective Association.

Accordingly, the invention is directed to the discovery of an access point (AP) in a wireless communication network by a mobile client (MC) having access to the network. Both the AP and MC MAC addresses are protected during all communications between the AP and MC during the discovery phase, thereby mitigating MAC address spoofing type attacks on the AP and MC. While specific reference is made to WLAN it is to be understood that the invention is not limited to WLAN technology. Other Wireless Technologies, including WiMax, can be considered ideal candidates for the solution provided by the present invention.

Therefore, in accordance with a first aspect of the invention there is provided in a wireless communications network, a method of selectively associating an access point (AP) by a mobile client (MC), the method comprising the steps of: a) forming a request message including two protected indicators, a first of which uniquely identifies an AP and a second of which uniquely identifies the MC; b) transmitting the request message into the wireless communication network; c) receiving the request message at the AP and determining whether the MC is a valid MC according to the two protected indicators; d) forming, responsive to the MC being a valid MC, a response message including another two protected indicators that uniquely identify the AP and MC, respectively; e) transmitting the response message into the wireless communication network; f) receiving the response message at the MC and determining whether the AP is a valid AP according to the another two protected indicators; and g) causing the MC to be associated with the AP responsive to the AP being a valid AP.

In accordance with a second aspect of the present invention there is provided, in a wireless communications network, a system for selectively associating an access point (AP) by a mobile client (MC), the system comprising: a) means for forming a request message including two protected indicators, a first of which uniquely identifies an AP and a second of which uniquely identifies the MC; b) means for transmitting the request message into the wireless communication network; c) means for receiving the request message at the AP and determining whether the MC is a valid MC according to the two protected indicators; d) means for forming, responsive to the MC being a valid MC, a response message including another two protected indicators that uniquely identify the AP and MC, respectively; e) means for transmitting the response message into the wireless communication network; f) means for receiving the response message at the MC and determining whether the AP is a valid AP according to the another two protected indicators; and g) means for causing the MC to be associated with the AP responsive to the AP being a valid AP.

BRIEF DESCRIPTION OF THE DRAWINGS

The invention will now be described in greater detail with reference to FIG. 1, which shows an example of mobiles performing selective association.

DETAILED DESCRIPTION OF THE INVENTION

Figure 1:
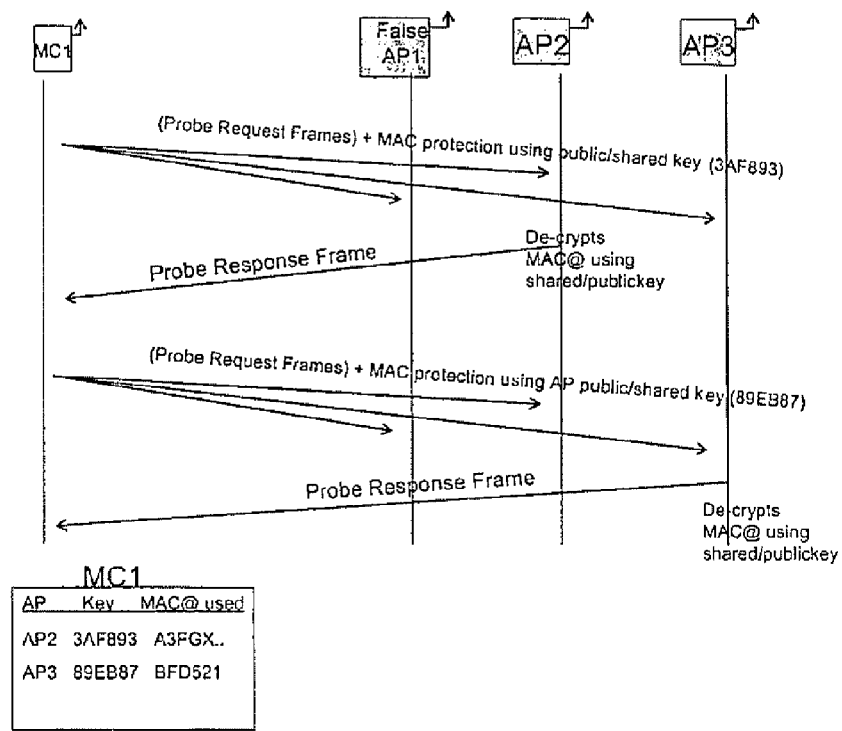

In an enterprise scenario it is quite common that an employee's Mobile/Wireless device, also referred to as MC (Mobile Client) hereafter, connects to the same AP (Access Point) each time he/she enters the office building and the number of APs that the MC connects to during the duration of their work may be limited.

The protection process of the present invention is initiated when selective association is required. Selective Association can be triggered by using location co-ordinates (e.g. GPS could be used to provide location info). For example, if the MC is close to the subscriber's office building or when close to its home then it can trigger the Selective Association procedure. If away from its home or office building then regular Association can be performed. The triggering of Selective association need not only be based on location but can also be other contexts. Another context that can trigger Selective Association is an application such as corporate email, or intranet access. The MAC address (MAC@) of the MC need not be a constant. An AP that takes part in the Selective Association process can provide the MC with the MAC@ that is expected when connecting the next time. Therefore unlike a conventional process of having fixed-MAC@, the MAC@ is dynamic. The MC therefore uses different MAC@ to connect to an AP at the office, while uses another MAC@ to connect to AP at home and so on. The MAC@ used can also change during the duration of a session or at the end of the connection. The new MAC@ that is expected to be used for a different session has to be communicated to the MC before the end of the session. The MC then updates its table to reflect the change in the MAC@ that is required to connect to that particular selective-Association capable AP the next time it connects.

Similarly, Home Networks are becoming quite a common phenomenon and in residential areas where each house hosts an AP, the MC would receive multiple probe/beacon messages from APs that are not from his/her own AP. Even if there are only a few houses equipped with APs, the range of the APs would mean that probe/beacon messages are received from APs that are more than just meters away. At apartment buildings this can become even more severe. In the following discussion reference is made to probe-request and probe-response messages. It is to be understood that the invention is not limited to probe messages but other types of messages can be protected as well. These types include management messages in general including, but not limited to, Association messages. In a WiMax application ranging messages can be protected.

The multiple probe/beacon messages discussed above poses the following problems:

1. The MC receives probe/beacon messages from genuine APs that are of no interest to the MC but it still has to process them which is a wastage of CPU/Battery resources.

2. Users that host False-AP (malicious AP) in the vicinity of an enterprise (corporate network) or residential areas can perform attacks to degrade the performance of MCs by depleting their resources and also exhausting the radio resources.

3. Traditional authentication mechanisms, including IEEE 802.11i, provide mutual authentication only after the association phase and this means that the messages exchanged prior to the authentication phase are not verified for authenticity which also leaves the MAC address open for spoofing and other attacks.

This invention requires the prior knowledge of public or shared keys of Access Points and their respective Medium Access Control (MAC) addresses by the mobile client. The assumption here, is that the Mobile Clients are required to be aware of the Access Point/s that it wants to be connected to, in advance and have a list of either the shared or public keys for the respective APs and vice versa.

Until now, the WLAN access has focused mainly from a hotspot scenario where a MC that moves from one hotspot to another requests connection to any AP regardless of its MAC address, security offered etc. In the present case the focus is to connect to a specific AP or a known list of specific APs that the MC trusts to offer certain services (security services for example).

The solution provided by the present invention is meant to be used in conjunction with IEEE 802.11i standards and not meant to be a competitor to the standards. This invention increases the level of security since the MAC addresses of the AP and MC are always protected. Not only can hiding of the addresses filter un-wanted messages but also, the derivation of keys used to protect the WLAN (WiMax) session are dependent upon the MAC addresses of the devices. Protecting the addresses provides additional robustness to the strength of the key.

On entering a WLAN (WiMax, etc) network, the Mobile Client sends probe-request frames (Ranging messages to Base Station in case of WiMax) to an AP with which it would request service. The client's MAC address is protected and so is the MAC address of the Access Point. In short both the source and destination MAC addresses are protected. The source MAC address of the Wireless device will be mixed using a Random value. Similarly, the destination's MAC address (AP's MAC) is also mixed using the same Random value. The Random value is added in order to avoid re-play attacks. An example of a Random (pseudo-random) value could be time and date when the message was created, the random value has to be quite random and should fit within a certain context. In addition to time and date, location information, for example, can be used for the random value. In short, the random value can be a function of a range of parameters as long as it is unique.

The following shows an example of MAC protection. In the example given below, the MAC addresses of the probe-request/response messages are hidden. The computation performed at the MC is shown below:

Example:

```
Start {
    RAND1 = Date + TimeofDay + someothervalues . . . (e.g.)
    Protecting the Source MAC addresses - Src-MAC (Mobile's MAC):
        MSMAC1 = (Src-MAC1) X'or (RAND1)
    EMSMAC1 = Encrypt (MSMAC1)_{key}
    Protecting the Destination MAC addresses - Dest-MAC (AP's MAC):
    MDMAC1 = (Dest-MAC1) X'or (RAND1)
    EMDMAC1 = Encrypt (MDMAC1)_{key}
} END
```

Note: The following variables are used:

RAND1: This is the Random value that is used to mix both the source and destination MAC addresses. The RAND1 can be a function of time/date/location of use etc . . . .

Mixed Source MAC (MSMAC1): This the value obtained after mixing Source MAC address by X'ORing MC's MAC address (source address) with RAND1.

Encrypted Mixed Source MAC (EMSMAC1): This is obtained by encrypting the MSMAC1 using an appropriate algorithm and using either a shared or public key of the AP.

Mixed Destination MAC (MDMAC1): This the value obtained after X'ORing the AP's address (destination address) with RAND1

Encrypted Mixed Destination MAC (EMDMAC1): This is the encrypted value obtained after encrypting MDMAC1 with shared/public key of AP.

Note: the algorithm required to encrypt the MAC has to be cryptographically strong.

At the end of the procedures the addresses are:

Source MAC address of the 802.11 frame: EMSMAC1

Destination MAC address of the 802.11 frame: EMDMAC1

Note: Both the addresses are Mixed and Encrypted

The probe-request is sent using source and destination addresses that have been mixed and then encrypted using pre-arranged algorithms and using a shared/public key. When an AP receives a probe-request message, the AP performs the following operations:

```
START {
1. DMDMAC1 = De-crypt (EMDMAC1)_key.
2. DRAND1 = (DMDMAC1) X'oR (APMAC)
3.If (DRAND1) is within a certain threshold of the current time and
matches the date or other parameters that was used to compute it,
then {
        #Process source MAC@
        4. Derived Mixed Source MAC (DMSMAC1) = De-crypt
(EMSMAC1)key
        5. Derived Source MAC (DSMAC1) = (DMSMAC1) X'oR
(DRAND1)
            6. If (DSMAC1) is one among the list then accept and send
    a probe-response/beacon frame.
        }
    } END
```

The abbreviations are:
Derived Mixed Destination MAC (DMDMAC1): This is the value when the EMDMAC1 sent by the MC is de-crypted by the AP using shared/public key of AP.
Derived RAND (DRAND1): This is derived by X'ORing the AP's MAC with the DMSMAC1. The derived MAC in all genuine cases must be equal to RAND1.
Derived Mixed Source MAC (DMSMAC1)=This is derived by decrypting EMSAMC1 using the shared/public key of AP
Derived Source MAC (DSMAC1)=This is obtained by X'ORing DMSMAC1 with MC's MAC address The AP creates a table binding the mobile client's MAC address to the RAND value, the table is updated when the AP receives additional messages from the client with the new RAND value. When the AP sends a probe-response, the AP performs the same process but uses a different RAND depending upon the various factors like time etc. The AP computes the following:

```
Start {
RAND2 = Date + TimeofDay + someothervalues . . . (e.g.)
    Protecting the Source MAC addresses (AP's MAC):
    MSMAC2 = (Src-MAC) X'or (RAND2)
    EMSMAC2 = Encrypt (MSMAC2)_key.
    Protecting the Destination MAC addresses (Mobile's MAC):
    MDMAC2 = (Dest-MAC) X'or (RAND2)
    EMDMAC2 = Encrypt (MDMAC2)_key.
    } END
```

The following abbreviations are used:
RAND2: This is generated by the AP using variables such as date/time/location etc.
Mixed Source MAC (MSMAC2): This is obtained by Mixing (X'ORing) AP's MAC@ with the RAND2

Encrypted Mixed Source MAC (EMSMAC2): The MSMAC2 is then encrypted using shared/public key of MC.
Mixed Destination MAC (MDMAC2): This is obtained by Mixing (X'ORing) the MC's address with the RAND2
Encrypted Mixed Destination MAC (EMDMAC2): The MDMAC2 is then encrypted using the shared/public key of MC.

The following algorithm is performed at the Mobile client to the beacon or Probe-response frame received from the AP:

```
START {
1. DMSMAC2 = De-crypt (EMDMAC2)key
2. DRAND2 = (DMSMAC1) X'oR (MC-MAC@)
3.If (DRAND2) is within a certain threshold of the current time and
matches the date then {
        #Process source MAC@
        4. DMSMAC2 = De-crypt(EMSMAC2)key
        5. DSMAC2 = (DMSMAC2) X'oR (DRAND2)
        6. If (DSMAC2) is one among the list then accept and send a
Probe-response/Association message.
    }
} END
```

The abbreviations used are:
Decrypted Mixed Source MAC (DMSMAC2): This is obtained by decrypting the EMDMAC2 using shared/public key of MC
Derived RAND (DRAND2): This derived by the MC by X'ORing DMSMAC2 with MC's MAC@
Derived Mixed Source MAC (DMSMAC2): This is obtained by decrypting EMSMAC2 using the shared/public key of MC.
Derived Source MAC (DSMAC2): This is derived by X'ORing the DMSAMC2 with DRAND2.

End of Example.

The mobile may send probe-request messages to multiple APs that it knows and that are in the vicinity of the Mobile. The destination MAC address, which is that of the AP is mixed with a Random Value and encrypted using the shared/public key and of course the encryption algorithms should be decided in advance which could be done at configuration time. The source MAC is protected by the same process and using the same RAND value.

The AP on receiving the probe-request message decrypts source and destination MAC addresses by using the shared key or its private key. Then it dissects the mixed destination MAC address. The AP that can correctly de-crypt the source MAC address responds to the probe-request by sending a beacon frame whose destination would be the MAC address of the client that it had de-crypted.

This ensures that only those APs that can correctly de-crypt the address, are legitimate APs or APs that the client would like to be served by. Multiple APs can respond with beacon frames, but the one that meets the signal strength or other factors is the one with which the Association is performed.

Even though the present invention may consume larger computational overhead compared to existing authentication mechanisms the overhead is still relatively small considering the large gain in terms of security. Depending upon the period of usage and the application the computational overhead could conceivably be much lower than conventional authentication mechanisms.

Although specific embodiments of the invention have been described and illustrated it will be apparent to one skilled in the art that numerous changes can be made without departing from the basic concept. It is to be understood, however, that such changes will fall within the full scope of the invention as defined by the appended claims.

We claim:

1. In a wireless communications network, a method of establishing selective association of an access point (AP) with a mobile client (MC), the method comprising:
    triggering said selective association in response to specific contexts, said specific contexts comprising at least one of location co-ordinates, corporate email, and intranet access, wherein said selective association involves the AP providing the MC with a dynamic Media Access Control (MAC) address that is expected during a subsequent connection;
    forming a request message including two protected indicators, a first of which uniquely identifies the AP and a second of which uniquely identifies the MC;
    transmitting the request message into the wireless communication network;
    receiving the request message at the AP and determining whether the MC is a valid MC according to the two protected indicators, wherein the two protected indicators are respective encrypted MAC addresses of the AP and the MC that have been first mixed with a first random number based on at least one of time, day and location values;
    forming, responsive to the MC being the valid MC, a response message including another two protected indicators that uniquely identify the AP and MC, respectively, wherein the another protected indicators for the probe-response message are respective encrypted MAC addresses of AP and MC that have been first mixed with a second random number based on at east one of time, day and location values, and the second random number is different from the first random number;
    transmitting the response message into the wireless communication network;
    receiving the response message at the MC and determining whether the AP is a valid AP according to the another two protected indicators; and
    causing the MC to be associated with the AP responsive to the AP being the valid AP.

2. The method as defined in claim 1, wherein the request and response messages are probe-request and probe-response messages respectively.

3. The method as defined in claim 1, wherein the request and response messages are management messages.

4. The method as defined in claim 1, wherein the request and response messages are association messages.

5. The method as defined in claim 1, wherein the MC repeats the method of establishing selective association for multiple APs and selects the AP which satisfies certain criteria.

6. The method as defined in claim 5, wherein the certain criteria represent a strongest signal for association.

7. The method as defined in claim 2, wherein the probe-request message including the two protected indicators is encrypted using a shared key.

8. The method as defined in claim 2, wherein the probe-request message including the two protected indicators is encrypted using a public key.

9. The method as defined in claim 2, wherein an encryption algorithm is implemented to encrypt MAC addresses.

10. The method as defined in claim 9, wherein the encryption algorithm is decided at configuration time.

11. The method as defined in claim 2, wherein the AP creates a table binding the MAC address of the MC to the first random number.

12. The method as defined in claim 11, wherein the AP updates the table when the AP receives additional messages from the MC.

13. The method as defined in claim 12, wherein the MAC address of the MC is dynamic.

14. The method as defined in claim 12, wherein the AP provides the MC with the MAC address that is expected on reconnecting.

15. The method as defined in claim 14, wherein the MAC address that is expected on reconnecting is communicated to the MC before a current session is terminated.

16. The method as defined in claim 15, wherein the AP updates its table to reflect the change in the MAC address.

17. The method as defined in claim 1, wherein the wireless communications network is a Wireless Local Area Network (W-LAN).

18. The method as defined in claim 1, wherein the wireless communications network is a WiMax network.

19. The method as defined in claim 18, wherein the request and response messages are ranging messages.

20. In a wireless communications network, a system for establishing selective association of an access point (AP) with a mobile client (MC), the system comprising:
    said selective association in response to specific contexts, said specific contexts comprising at least one of location co-ordinates, corporate email, and intranet access, wherein said selective association involves the AP providing the MC with a dynamic Media Access Control (MAC) address that is expected during a subsequent connection;
    a first device that forms a request message including two protected indicators, a first of which uniquely identifies the AP and a second of which uniquely identifies the MC;
    a first transmitter that sends the request message into the wireless communication network;
    a first receiver that receives the request message at the AP and determining whether the MC is a valid MC according to the two protected indicators, wherein the two protected indicators are respective encrypted MAC addresses of the AP and the MC that have been first mixed with a first random number based on at least one of time, day and location values;
    a second device that forms, responsive to the MC being the valid MC, a response message including another two protected indicators that uniquely identify the AP and MC, respectively, wherein the another two protected indicators for the probe-response message are respective encrypted MAC addresses of AP and MC that have been first mixed with a second random number based on at least one of time, day and location values, and the second random number is different from the first random number;
    a second transmitter that sends the response message into the wireless communication network;
    a second receiver receives the response message at the MC and determining whether the AP is a valid AP according to the another two protected indicators; and
    a third device that causes the MC to be associated with the AP responsive to the AP being the valid AP.

21. The system as defined in claim 20, wherein the request and response messages are probe-request and probe-response messages.

22. The system as defined in claim 21, wherein an encryption process is performed using a pre-arranged algorithm.

23. The system as defined in claim 22, wherein a shared key is used in the encryption process.

24. The system as defined in claim 22, wherein a private key is used in the encryption process.

25. The system as defined in claim 21, wherein a probe-response or association message is sent by the AP to the MC confirming that it is valid.

* * * * *

UNITED STATES PATENT AND TRADEMARK OFFICE
CERTIFICATE OF CORRECTION

| | | |
|---|---|---|
| PATENT NO. | : 7,783,756 B2 | Page 1 of 1 |
| APPLICATION NO. | : 11/143620 | |
| DATED | : August 24, 2010 | |
| INVENTOR(S) | : Vinod Kumar Choyi et al. | |

It is certified that error appears in the above-identified patent and that said Letters Patent is hereby corrected as shown below:

Column 7, Claim 1, line 31, after "another" please insert --two--

Column 7, Claim 1, line 34, please change "east" to "least"

Column 8, Claim 20, line 50, please change "receiver receives" to "receiver that receives"

Signed and Sealed this

Twelfth Day of October, 2010

David J. Kappos
*Director of the United States Patent and Trademark Office*